(Model.)
J. A. MITCHELL.
HEDGE.
No. 358,815. Patented Mar. 1, 1887.
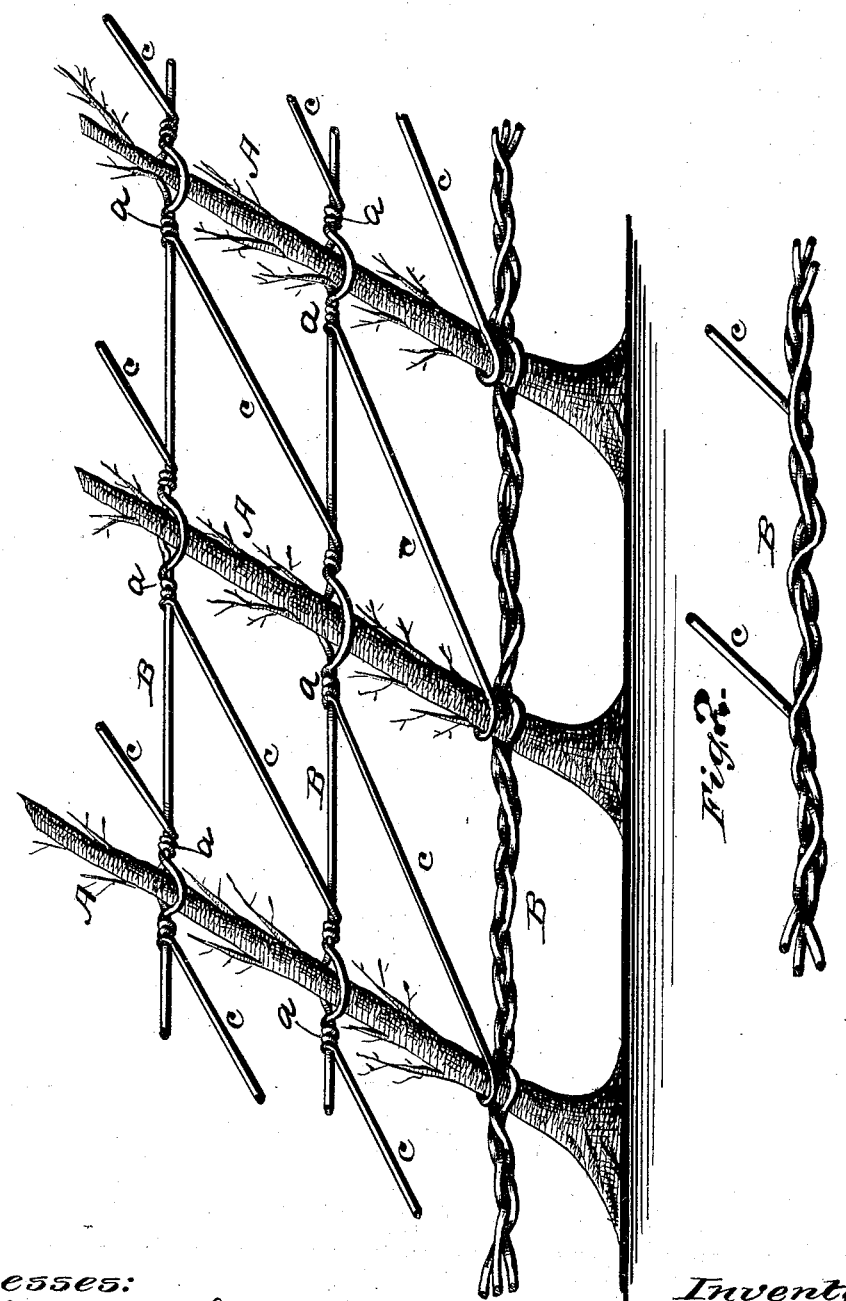

UNITED STATES PATENT OFFICE.

JAMES A. MITCHELL, OF WESTMINSTER, MARYLAND.

HEDGE.

SPECIFICATION forming part of Letters Patent No. 358,815, dated March 1, 1887.

Application filed October 5, 1886. Serial No. 215,378. (Model.)

*To all whom it may concern:*

Be it known that I, JAMES A. MITCHELL, a citizen of the United States, residing at Westminster, in the county of Carroll and State of Maryland, have invented certain new and useful Improvements in Hedges; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in hedges; and it consists in providing the horizontal wires which support the hedge with adjustable tie-wires, and so arranging the latter that the tying-wires can be used in plashing the living plants of the hedge, thus affording an impenetrable hedge.

My object is to improve the growth of living plants, especially the osage orange, wherein the twigs have been used in securing the plants in an inclined position, all as will be hereinafter more fully explained, and particularly pointed out in the appended claims.

The annexed drawings, to which reference is made, illustrate my invention, in which—

Figure 1 is a side view of a hedge, showing my improvement, and Fig. 2 is a detail view of the lower line or tie wire shown in Fig. 1.

It will be seen by reference to the annexed drawings that I take the young and living plants A, without branches, incline them at a proper angle to the ground, and tie them together, as well as to the line or horizontal wire B, by means of the wires c, of suitable strength to retain them at the given angle, which wires are twisted loosely about the line or main wires, as at a, forming loops inclosing the plants, so that they can be slipped to adjust them to the plants as may be required in their relation to one another in an inclined position.

In Fig. 1 of the drawings I show the line and tie wires composed of wires c, interwoven in such a manner that practically a strong wire rope, B, is obtained, which serves as a rail for the plants A, and before being tied thereto said wires c can be drawn out the desired length from wire B to reach from one plant to the other for tying and plashing the hedge, and are interwoven with the growing plants, so as to connect them and the cable or line-wire B, and make an impenetrable hedge of wire-plashed and growing plants, and which may be constructed before the live branches of the plants are long enough to to be utilized. By this means I am not only able to secure the young and living plants without branches in the inclined position, but secure the plants to the line-wires or rails, and also plash the plants when young and render the fence practically useful at the first setting out, and form an impenetrable hedge; and in plashing and securing the plants to the main wires the tie-wires c are first carried around the plant in such a manner as to secure it loosely thereto, after which said tie-wire is carried obliquely to the upper line wires, where they are loosely connected, thus holding the plant between the tie-wire and main wire, as clearly shown in the annexed drawings.

It will be seen that by connecting the tie-wires loosely to the main wires the tie-wires will slip more or less as the plants grow, thus accommodating themselves to the movement of the growing hedge and preventing the binding of said wires and plants, and offering no resistance to their growth. At the same time the tie-wires (shown loosely interwoven) serve to secure the plants in an inclined position to the line-wires as diagonal wires and as a rail or line-wire.

What I claim, and desire to secure by Letters Patent, is—

1. In a hedge fence, the combination, with the hedge-plants, of the single upper line-wires and the lower line and tie wire, consisting of short wires loosely interwoven, whereby each individual wire can be drawn out, forming diagonally-arranged wires for tying and plashing the plants, substantially as described.

2. A hedge fence consisting of plants bent in the direction of the line of the fence, upper single line-wires, and a lower line and tie wire, said lower wire consisting of short wires loosely interwoven, so as to be drawn out and wrapped about the adjacent plant, extended obliquely to the line-wires, and wrapped about the same to form loops for the plants, substantially as described.

In testimony whereof I affix my signature in presence of two witnesses.

JAMES A. MITCHELL.

Witnesses:
GEORGE BATSON,
H. E. FIDDIS.